(12) United States Patent
Balbás

(10) Patent No.: US 11,815,599 B2
(45) Date of Patent: Nov. 14, 2023

(54) LIDAR SYSTEM WITH SUPPRESSED DOPPLER FREQUENCY SHIFT

(71) Applicant: MOURO LABS S.L., Tres Cantos Madrid (ES)

(72) Inventor: Eduardo Margallo Balbás, Tres Cantos Madrid (ES)

(73) Assignee: MOURO LABS, S.L., Madrid (ES)

(*) Notice: Subject to any disclaimer, the term of this patent is extended or adjusted under 35 U.S.C. 154(b) by 0 days.

(21) Appl. No.: 17/919,632

(22) PCT Filed: Apr. 21, 2021

(86) PCT No.: PCT/EP2021/060383
§ 371 (c)(1),
(2) Date: Oct. 18, 2022

(87) PCT Pub. No.: WO2021/214135
PCT Pub. Date: Oct. 28, 2021

(65) Prior Publication Data
US 2023/0146113 A1    May 11, 2023

(30) Foreign Application Priority Data
Apr. 21, 2020  (ES) .............................. ES202030326

(51) Int. Cl.
*G01P 3/36*  (2006.01)
*G01S 17/34* (2020.01)
(Continued)

(52) U.S. Cl.
CPC ............ *G01S 17/34* (2020.01); *G01S 7/4913* (2013.01); *G01S 7/4917* (2013.01)

(58) Field of Classification Search
None
See application file for complete search history.

(56) References Cited

U.S. PATENT DOCUMENTS

| 7,986,397 B1 | 7/2011 | Tiemann et al. |
| 2019/0018110 A1 | 1/2019 | Kremer et al. |

(Continued)

FOREIGN PATENT DOCUMENTS

| EP | 1835305 A2 | 9/2007 |
| EP | 3683600 A1 | 7/2020 |

(Continued)

OTHER PUBLICATIONS

International Search Report and Written Opinion received for PCT/EP2021/060383, dated Jul. 15, 2021. 10 pages.

(Continued)

*Primary Examiner* — Mark Hellner
(74) *Attorney, Agent, or Firm* — Finch & Maloney PLLC

(57) ABSTRACT

A LIDAR system which reduces or suppress the frequency shift induced by the movement of objects in a scene relative to the LIDAR, and which comprises a light source, an input aperture (101), a splitter (2) configured to split a reflected light into a reference channel (4) and a first imaging channel (3), a first imaging optical IQ receiver (5) configured to obtain a first interference signal, a reference optical IQ receiver (6) configured to obtain a reference interference signal, an imaging oscillator (111), configured to be temporarily coherent with the reflected light, at least a mixer (12), connected to the first imaging optical IQ (5) and to the reference optical IQ (6) and configured to obtain a first intermodulation product with a higher frequency and an intermodulation product of interest with its Doppler Shift scaled.

22 Claims, 7 Drawing Sheets

(51) Int. Cl.
    *G01S 7/4913*     (2020.01)
    *G01S 7/4912*     (2020.01)

(56)     References Cited

U.S. PATENT DOCUMENTS

| | | |
|---|---|---|
| 2020/0072979 A1 | 3/2020 | Boloorian et al. |
| 2021/0072381 A1* | 3/2021 | Crouch ................. G01S 17/931 |
| 2021/0255293 A1* | 8/2021 | Kryvobok ............... G01S 17/58 |

FOREIGN PATENT DOCUMENTS

| | | | |
|---|---|---|---|
| WO | WO 2018221060 A1 * | 12/2018 | ........... G01S 17/931 |
| WO | 2019130472 A1 | 7/2019 | |
| WO | 2020005641 A1 | 1/2020 | |
| WO | 2021214135 A1 | 10/2021 | |

OTHER PUBLICATIONS

International Preliminary Report on Patentability received for PCT/EP2021/060383, dated Aug. 3, 2022. 17 pages.

* cited by examiner

LIDAR SYSTEM WITH SUPPRESSED DOPPLER FREQUENCY SHIFT

OBJECT OF THE DISCLOSURE

The object of the invention is a LIDAR system which allows reducing or completely suppressing the frequency shift induced by the movement of objects in a scene relative to the LI DAR, an effect known as Doppler frequency shift.

BACKGROUND

A light detection and ranging (LIDAR) device creates a distance map to a target by illuminating the target with laser light and measuring the reflected light with a sensor. Differences in the properties of laser light, including total round-trip times, phase or wavelength can then be used to make digital 3D representations of the target.

LIDAR is commonly used to make high-resolution maps, with applications in geodesy, geomatics, archaeology, geography, geology, geomorphology, seismology, forestry, atmospheric physics, laser guidance, airborne laser swath mapping (ALSM), and laser altimetry. The technology is also used in control and navigation for some autonomous vehicles.

Some LIDAR's make use of what is known as coherent detection. In this detection scheme, the light reflected on the sample is mixed with a local oscillator that is coherent with the reflected light. This approach has several advantages, such as optical gain that allows single-photon sensitivity, and enables the use of changes in the phase and wavelength of light to measure distance.

A common problem that appears when making use of this type of LIDARs is the frequency shift induced by the movement of the objects in the scene relative to the device, an effect known as Doppler frequency shift. Such frequency shifts may be large relative to the bandwidth of the signals used to measure relevant properties of the objects and may complicate the extraction of such relevant data. This problem becomes of major importance if the relative speed of the objects is significant, as in the case of vehicles, aircrafts or satellites.

This frequency shift is variable and often unknown and can expand the bandwidth of the detected signals very significantly. In the case of ground vehicles, the relative speed can reach 300 km/h and higher. This relative speed corresponds to a Doppler frequency shift of 54.0 MHz for illumination of $\lambda=1.55$ µm. This variable frequency shift complicates the electronic readout and signal processing chain of systems that depend on coherent detection of the object signal.

Even if the signal chain may be still manageable for a small number of channels, it adds to the cost, size and complexity of the final LI DAR system. Furthermore, it poses a major obstacle for the practical implementation of multi-channel coherent LIDAR system with a large number of inputs.

To solve the explained problem there have been several approaches, including one of them being using a non-uniform sampling or other compressed sensing schemes to reduce the overall data rate of the signals.

In general, all of the approaches developed have the same drawbacks: complex electronics readout circuitry and general signal processing chain, which makes them expensive, big in size, and in general difficult to implement and to scale for multi-channel architectures with a large number of channels.

SUMMARY

The LI DAR system object of the present invention describes a modification of a coherent LIDAR system that makes use of one or more input apertures, and which is simple in its implementation. Its goal is to reduce or completely eliminate the frequency shift induced by the movement of objects in a scene relative to the LI DAR, an effect known as Doppler frequency shift.

In the invention, the reduction or elimination of the frequency shift is done by measuring the Doppler shifted signal in a reference channel and then, making use of mathematical properties of signal mixing in the time domain, to shift the frequency of one or more imaging channels to cancel or reduce said Doppler shift.

Specifically, the light detection and ranging (LIDAR) system with supressed Doppler frequency shift of the present invention comprises at least a light source configured to emit a first light, aimed to an external object. The first light is reflected diffusely or specularly on the object and is then received in at least an input aperture, being therefore a reflected light.

The reflected light can then be split in a splitter, positioned following the at least an input aperture, being the splitter configured to split the reflected light into a reference channel and at least a first imaging channel.

A part of the split reflected light is then guided through the at least a first imaging channel to a first imaging optical IQ (In-phase and Quadrature) receiver associated to the first imaging channel. The first imaging optical IQ receiver is configured to obtain a first interference signal which comprises a first in-phase component and a first quadrature component.

Additionally, another part of the reflected light is guided through the reference channel into a reference optical IQ receiver associated to the reference channel. The reference optical IQ receiver is configured to obtain a reference interference signal which comprises a reference in-phase component and a reference quadrature component.

At least a local optical oscillator is associated to the first imaging optical IQ receiver and to the reference optical IQ receiver and is configured to be temporarily coherent with the reflected light.

Lastly, in an embodiment, the system comprises at least a mixer, connected to the first imaging optical IQ receiver and to the reference optical IQ receiver, and configured to obtain a first intermodulation product with a higher frequency and a second intermodulation product of interest with its Doppler Shift scaled or completely eliminated.

The system described above is one possible embodiment of the present invention. However, the system can comprise a reference aperture and several input apertures, or a reference channel and several imaging channels associated to one or more input apertures. The system can also comprise a single local optical oscillator associated to all the optical IQ receivers, or a reference local optical oscillator associated to the reference optical IQ receiver and an imaging local optical oscillator associated to the imaging optical IQ receivers, or a reference local optical oscillator associated to the reference optical IQ receiver, and several imaging local optical oscillators, associated each to one or more imaging optical IQ receiver.

The system can also comprise an optical amplitude and/or phase modulator applied to the imaging local optical oscillators, such that the generation of the intermodulation products happens directly at the photodetector without the need for electronic mixing.

DESCRIPTION OF THE DRAWINGS

To complement the description being made and in order to aid towards a better understanding of the characteristics of the invention, in accordance with a preferred example of a practical embodiment thereof, a set of drawings is attached as an integral part of said description wherein, with illustrative and non-limiting character, the following has been represented.

DETAILED DESCRIPTION

With the help of FIGS. 1 to 6, preferred embodiments of the present invention are described below.

Figure 1:
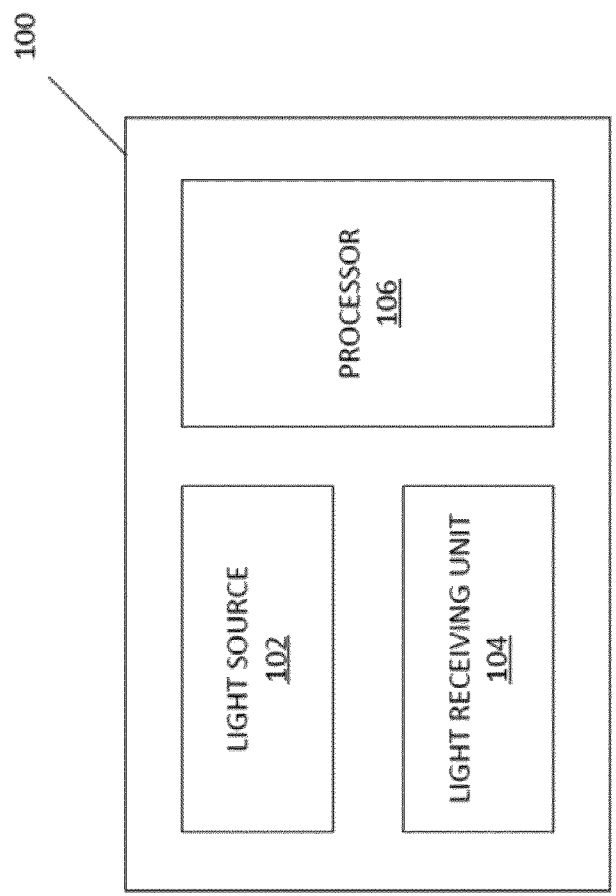
FIG. 1 shows an example LIDAR system imaging an object in an embodiment of the invention.
Figure 1:
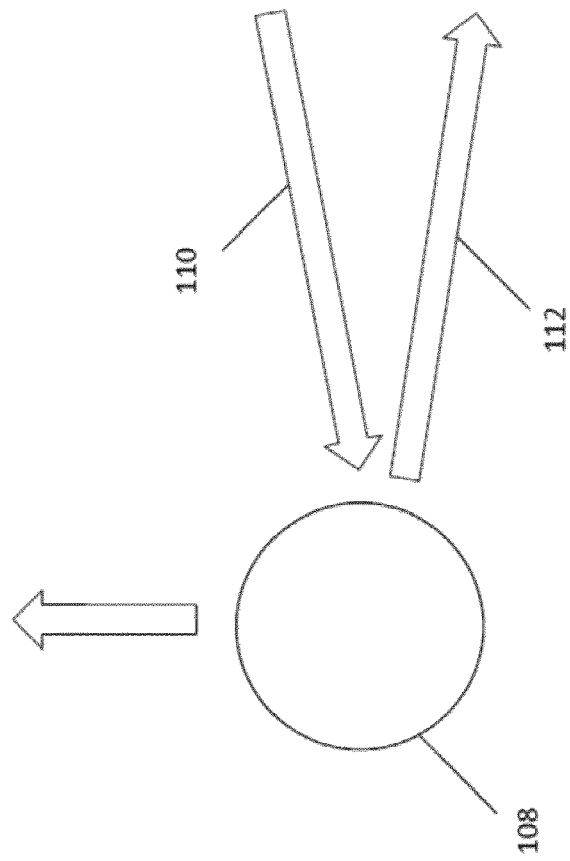

The invention relates to a LIDAR system, such as LIDAR system (100) illustrated in FIG. 1, which comprises at least a light source (102) configured to emit light (110), aimed at an external object (108). The light is reflected from object (108) and the reflected light (112) is received by a light receiving unit (104). More specifically, the light is received at a reference input aperture (103) and in an imaging input aperture (101) in a first embodiment of the invention, as discussed in more detail with reference to later figures. Light source (102) may represent a single light source, or multiple light sources having different wavelengths. In some embodiments, light source (102) includes one or more laser sources.

LIDAR system (100) also includes a processor (106) that is configured to receive electrical signals from light receiving unit (104) and perform one or more processes using the received electrical signals. For example, processor (106) may use the received electrical signals to reconstruct a 3D image that includes object (108). As noted above, movement of object (108) (identified by the upward arrow) while trying to capture reflected light (112) causes a frequency shift induced by the movement of object (108) relative to the LIDAR system (100), an effect known as Doppler frequency shift.

Figure 1A:
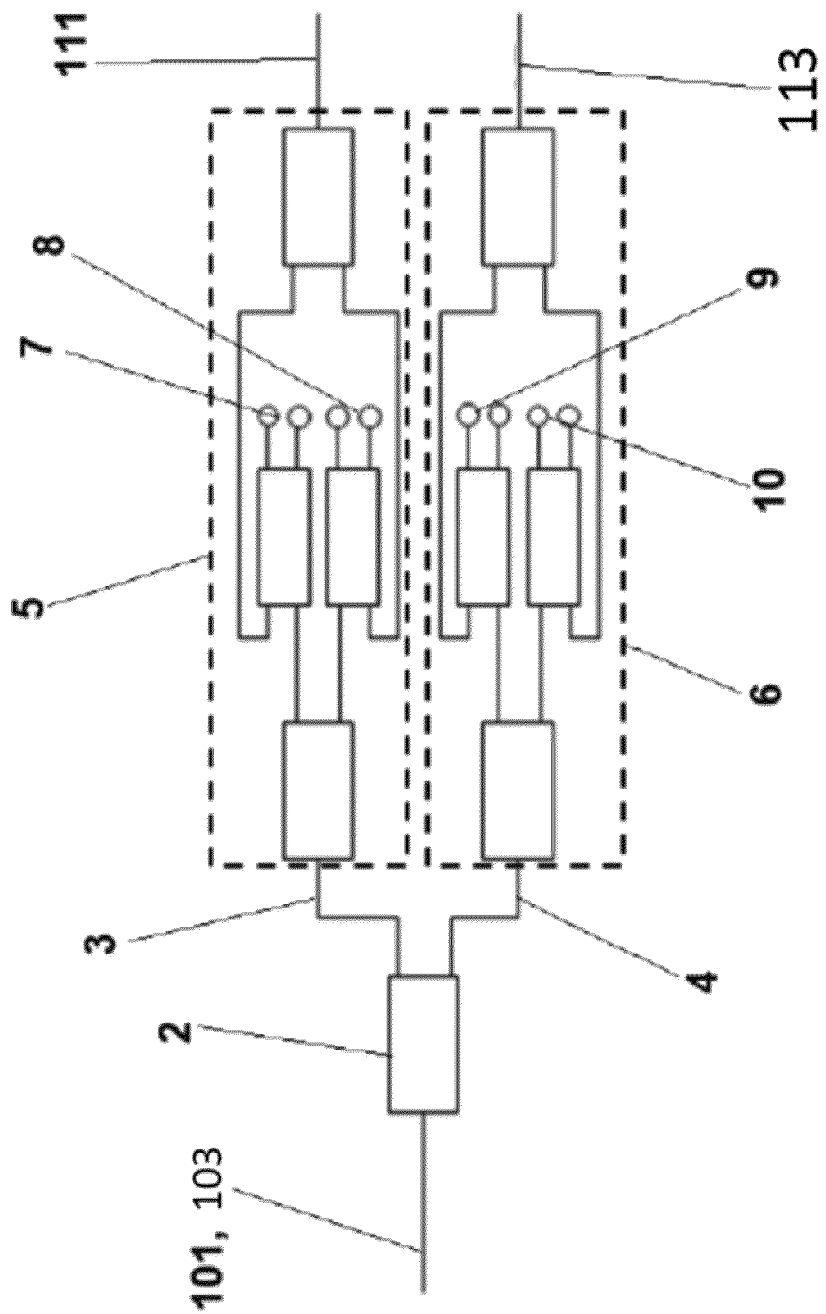
FIG. 1A shows a scheme of the input aperture, optical IQ receivers and reference and imaging local optical oscillators in an embodiment of the invention.

As seen in FIG. 1A, the reference input aperture (103) allows the LIDAR system (100) to produce a reference interference signal between the reflected light coming from object (108) and a reference oscillator (113). This reference interference signal is then used to modulate an interference signal formed between the reflected light (112) coming from object (108) collected by the imaging input aperture (101), and an imaging oscillator (111).

In any given implementation, the reference input aperture (103) and one or more of the imaging input aperture(s) (101) may overlap, as shown for example in the embodiment of FIG. 1A, as well as the reference oscillator (113) and imaging oscillators (111).

According to some embodiments, the reference oscillator (113) and imaging oscillator (111) exhibit some degree of temporal coherence with the reflected light (112), in such a way that the interference signal formed can be processed at electrical frequencies.

In one example, shown in FIG. 1A, the system comprises a single input aperture (101,103). In this case the system comprises light source (102), which emits a light aimed to object (108). The light reflects off the object and the reflected light (112), which enters the system by the input aperture (101,103), is split into a first imaging channel (3) and a reference channel (4) by a splitting element (2), which may be a 1×2 splitter.

According to some embodiments, at least two channels, (e.g., the reference channel (4) and the first imaging channel (3), are affected by the movement of the objects through Doppler frequency shift substantially in the same manner, while the non-Doppler information-bearing modulation stays different between them. This allows the signals on both channels to combine in a way where the Doppler frequency shift is eliminated or greatly reduced, while the information-bearing modulation is recovered.

As shown in FIG. 1A, the first imaging channel (3) is fed to a first imaging optical IQ receiver (5), and the reference channel (4) is fed to a reference optical IQ receiver (6). The first imaging optical IQ receiver (5) is associated with an imaging oscillator (111) and the reference optical IQ receiver (6) is associated with a reference oscillator (113). Within the optical IQ receivers (5, 6), both oscillators (111, 113) are fed through 90° hybrids generating the phase shift between the in-phase component (7, 9) and the quadrature component (8, 10) of each channel, according to some embodiments.

Figure 1B:
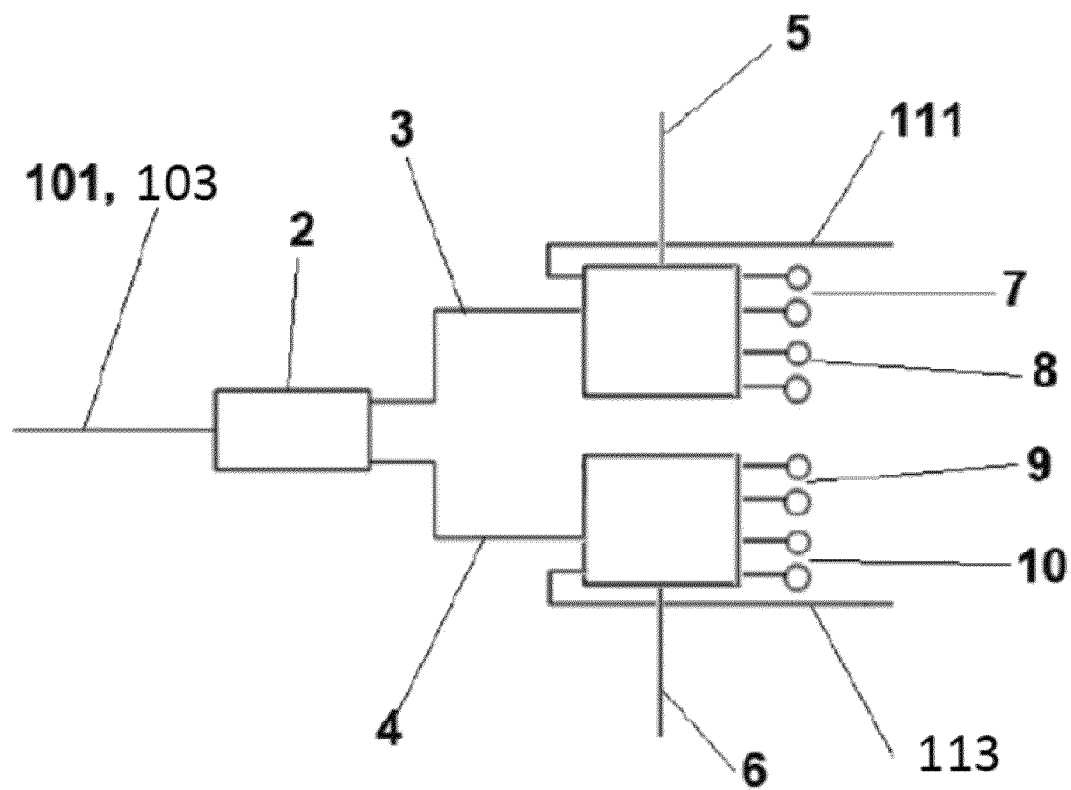
FIG. 1B shows an alternative implementation in which 2×4 MMIs are used for the optical IQ receivers in an embodiment of the invention.

In other embodiments, the IQ receivers (5, 6) are implemented by means of 2×4 MMI couplers designed to provide the phase shifts between the 4 outputs (7, 8, 9, 10) and each of the two inputs (3, 4). In FIG. 1B, an embodiment is shown in which the first imaging optical IQ receiver (5) is a 2×4 MMI coupler which is fed with the first imaging channel (3) and an imaging oscillator (111), and the reference optical IQ receiver (6) is a 2×4 MMI coupler which is fed with the reference channel (4) and a reference oscillator (113).

In an embodiment, the imaging oscillator (111) has its wavelength swept following a standard FMCW (Frequently Modulated Continuous Wave) scheme and the reference oscillator (113) keeps its wavelength static. According to some embodiments, the reflected light (112) has components that are coherent with both components in the oscillators (111, 113). For this, either illumination is derived from a combination of both components, or both components share a common origin with the illumination that guarantees mutual coherence.

According to some embodiments, the first imaging optical IQ receiver (5) is associated with the first imaging channel (3) and it is configured to obtain a first interference signal comprising a first in-phase component (7) and a first quadrature component (8). The reference optical IQ receiver (6) is associated to the reference channel (4) and configured to obtain a reference interference signal comprising a reference in-phase component (9) and a reference quadrature component (10).

Both interference signals will be affected by Doppler substantially in the same way (with small differences due to the different wavelengths, in some embodiments). However, only the first interference signal, associated with the imaging oscillator (111), carries information about distance between object (108) and LIDAR system (100) in its interference frequency.

Figure 2:
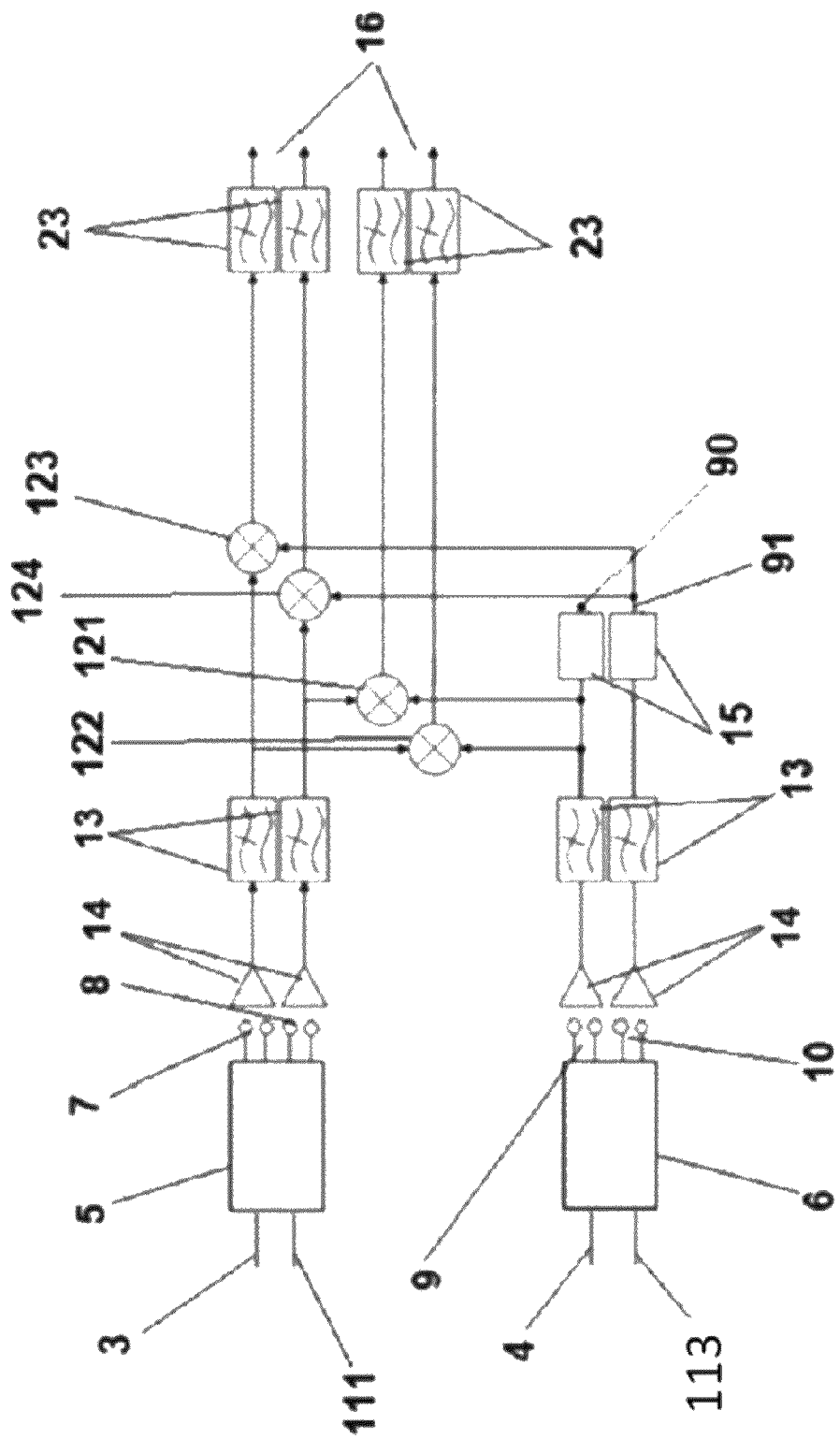
FIG. 2 shows a scheme of the LIDAR system in an embodiment of the invention with a reference channel and an imaging channel.

As seen in FIG. 2, mixing the first interference signal and the reference signal, in at least one mixer 121-124 (sometimes also identified collectively as 12), results in the generation of two intermodulation products. For example, the mixing produces a first intermodulation product with higher frequency, which can be discarded, and an output intermodulation product (16) with lower frequency, which has its Doppler shift significantly scaled, and which provides the possibility of taking the ranging and amplitude information to baseband, thus minimizing sampling frequency and electronics readout complexity.

For illustration, the first interference signal and the reference interference signal are derived for this implementation as discussed herein. It is assumed that the imaging input aperture (101) and the reference aperture (103) are substantially at the same position, except for possible relative phase shifts if the imaging input aperture (101) is part of an array. In the case of equal illumination of the scene with two light sources of two wavelengths (with associated wavenumbers and angular frequencies $k_1$, $k_2$ and $\omega_1$, $\omega_2$, respectively) and equal amplitude A, the light signal at a distance x from the light source is:

$$E(x, t) = A(x)\left\{e^{j\left[k_1 x - \left[\omega_1 t + \pi K(t - \frac{x}{c})^2\right]\right]} + e^{j(k_2 x - \omega_2 t)}\right\}$$

Where it is assumed that the first wavelength of the first light source of the LIDAR system undergoes a linear frequency modulation with constant K. If the object that reflects the light emitted by the first light source is a single diffuse reflector, the object, at a distance $x_j$ with intensity reflectivity $\rho_j$ in the direction of the input aperture (101) and relative velocity in the direction between input aperture (101) and object $v_j$, the reflected field of the light collected at the input aperture (101) will be:

$$E_{i,j}(t) = \rho_j A_i(x_j)\left\{e^{j\left[2k_1 x_j - \left((\omega_1 - 2k_1 v_j)t + \pi K\left(t - \frac{2x_j}{c}\right)^2\right)\right]} + e^{j[2k_2 x_j - (\omega_2 - 2k_2 v_j)t]}\right\}$$

Where i is the index of the input aperture in case there is an array of apertures. The Doppler shift is visible in the $2k_1 v_j$ and $2k_2 v_j$ terms in the equations, modifying the frequency of the reflected light.

For the calculation of the interference signals in the optical IQ receivers (5, 6), it is assumed for simplicity that the two wavelength components of the reference and imaging oscillators (111, 113) have unity amplitude:

$$E_{\lambda_1}(t) = [e^{-j(\omega_1 t + \pi K t^2 + \phi_1)}]$$

$$E_{\lambda_2}(t) = e^{-j(\omega_2 t + \phi_2)}$$

After the imaging optical IQ receiver (5) and the reference optical IQ receiver (6), the first interference signal and the reference interference signal are, respectively:

$$E_{i,j}(t)E^*_{\lambda_1}(t) = \rho_j A_i(x_j)\left\{e^{j\left[2k_1 x_j + 2k_1 v_j t - \pi K\left[\left(t - \frac{2x_j}{c}\right)^2 - t^2\right] + \phi_1\right]} + e^{j(2k_2 x_j - (\omega_2 - \omega_1 - 2k_2 v_j) + \pi K t^2 \phi_1)}\right\} \quad 1.$$

$$E_{i,j}(t)E^*_{\lambda_2}(t) = \rho_j A_i(x_j)\left\{e^{j\left[2k_1 x_j - (\omega_1 - \omega_2 - 2k_1 v_j)t - \pi K\left(t - \frac{2x_j}{c}\right)^2 + \phi_2\right]} + e^{j[2k_2 x_j + 2k_2 v_j t + \phi_2]}\right\} \quad 2.$$

In these, the beating products where the difference of optical angular frequencies persist will be at a very high frequency for electrical standards once detected. For example, assuming that the two wavelengths of the light of the light sources are 0.1 nm apart at a wavelength of 1.55 µm, the intermodulation product has a frequency of 12.5 GHz:

$$\Delta f = -\frac{\Delta \lambda}{\lambda^2} c$$

On the contrary, the beating products where the local oscillator and reflected light frequencies are equal are demodulated to a lower frequency, derived from the frequency difference between the emitted and received phase modulation frequency plus or minus the Doppler shift.

For the typical speed of ground vehicles, the Doppler shift will be equal or lower than 100 MHz, so it is possible to suppress the higher frequency mixing terms (those which include the difference of optical angular frequencies) by means of a low-pass filter, according to some embodiments. Therefore, as shown in FIG. 2, a first set of low-pass filters (13) can be associated with the optical IQ receivers (5, 6) in order to filter the first in-phase component (7), the first quadrature component (8), the reference in-phase component (9) and the reference quadrature component (10).

The low-frequency components of the interference signals are provided as the following:

$$I_1(t) = E_{i,j}(t)E^*_{\lambda_1}(t) = \frac{\rho_j A_i}{x_j^2} e^{j\left[\left(2k_1 v_j + 4\pi K \frac{x_j}{c}\right)t + 2k_1 x_j - 4\pi K \frac{x_j^2}{c^2} + \phi_1\right]} \quad 3.$$

$$I_2(t) = E_{i,j}(t)E^*_{\lambda_2}(t) = \frac{\rho_j A_i}{x_j^2} e^{j(2k_2 v_j t - 2k_2 x_j + \phi_2)} \quad 4.$$

The depth and speed information are encoded in the frequency (and phase) of both photocurrents. By focusing on the frequency information only, it is observed that the frequencies of $I_1(t)$ and $I_2(t)$ are:

$$f_1 = \frac{2v_j}{\lambda_1} + K\frac{2x_j}{c}$$

$$f_2 = \frac{2v_j}{\lambda_2}$$

The components of these two frequency shifts scale differently with the line rate. The modulation constant K makes a direct impact on distance-derived frequencies. However, the Doppler shift remains independent and is determined by scene properties. Since the Doppler shift can go up to frequencies of several tens of MHz, it typically utilizes fast acquisition electronics, which can add to the cost of the system. These video frequencies may also be a problem when it comes to scaling up the scene detection with multiple parallel imaging channels (3).

However, the difference of these two frequencies is:

$$\Delta f = f_1 - f_2 = 2v_j\left(\frac{1}{\lambda_1} - \frac{1}{\lambda_2}\right) + K\frac{2x_j}{c}$$

According to some embodiments, if the two wavelengths of the lights emitted by the two light sources are chosen to be close to each other (for example, a separation of 0.1 nm at a wavelength of 1.55 μm), the difference of Doppler frequency shifts is significantly reduced (2 kHz for a $v_j$ of 50 m/s).

However, it is noteworthy that both wavelengths can be equal. In this case, the Doppler shift may be totally suppressed, whereas the frequency shift due to FMCW is preserved. This approach simplifies the optical system and the associated electro-optical circuitry.

If both wavelengths are equal, the Doppler shift may be totally suppressed and signal frequency is moved to baseband. This lower Doppler frequency allows for significant reduction of line rate, data throughput and hardware complexity in systems where a large number of input apertures (101) are desired. If the Doppler frequency is preserved, then the Doppler shift should be disambiguated from the FMCW modulation in order to be measured. One example way to achieve this is to change K in the FMCW frequency sweep over time (e.g. alternating its sign) and to compare the resulting electrical frequency shifts between both modulation slopes.

One example way to subtract the frequencies obtained from the optical IQ receivers (5, 6) above is to multiply one of the currents with the complex conjugate of the other. Standard frequency mixing techniques can be applied. This can be done in the digital or analog domain and potentially on the basis of the interference signals as indicated below:

$$I_1(t)*I*_2(t)=(I_{1i}*I_{2i}+I_{1q}*I_{2q})+j(I_{1i}*I_{2q}-I_{1q}*I_{2i})$$

In an embodiment, this can be implemented, as shown in FIG. 2, using one or more mixers 121-124 connected to the first imaging optical IQ (5) and to the reference optical IQ (6) outputs or to the first low-pass filter set (13) outputs. Each of the four multiplicative terms above contains a first intermodulation product with the difference of frequencies Δf (low-frequency) and a second intermodulation product which includes the addition of doppler frequencies $$2v_j\left(\frac{1}{\lambda_1} + \frac{1}{\lambda_2}\right).$$

When the four multiplicative terms are combined, the terms related to the addition of doppler frequencies are cancelled, and only the low-frequency intermodulation products, which contain the depth information in its frequency (as per Δf above), remain as output intermodulation products (16).

According to some embodiments, higher frequency components of each of the multiplicative terms are filtered out using a second set of low-pass filters (23), such that only the low-frequency intermodulation products are kept. These low-frequency intermodulation products contain the depth information in its frequency (as per Lf above), as output intermodulation products (16). According to some embodiments, the output intermodulation products (16) are amplified using one or more non-linear amplifiers (25).

In the embodiment shown in FIG. 2, the one or more mixers 121-124 include a first mixer 121 designed to mix the first quadrature component (8) and the reference in-phase component (9), giving the multiplicative term ($I_{1q}*I_{2i}$), and a second mixer 122, designed to mix the first in-phase component (7) and the reference in-phase component (9), giving the multiplicative term ($I_{1i}*I_{2i}$).

In an alternative demodulation technique, one can work with the individual components of the interference signals, meaning the first in-phase component (7), the first quadrature component (8), and the derivatives of the reference interference signals, as provided by a time derivation module (15), which produces the time-derivative of the reference in-phase component (90) and the time-derivative of the reference quadrature component (91), and adapt FM demodulation techniques that simultaneously carry out baseband conversion and demodulation.

This can be particularly useful in embodiments where both the imaging oscillator and the reference oscillator are the same, since in that situation the frequency difference in the multiplicative terms as expressed above would be Δf=0, and the use of time-derivatives allows to extract the frequency-encoded depth-information to the amplitude of the time-derived signals.

For example, the operation that can be performed in the one or more mixers (121)-(124) in this case, in which the imaging and the reference oscillator are the same, is:

$$I_{1Q}(t)I'_{2I}(t) - I_{1I}(t)I'_{2Q}(t) = \rho_j^2 A(x_j)_i^2\left[2k_1 v_j + 2\pi K\frac{x_j}{c}\right]\cos(\phi_i)$$

$$I_{1I}(t)I'_{2I}(t) - I_{1Q}(t)I'_{2Q}(t) = \rho_j^2 A(x_j)_i^2\left[2k_1 v_j + 2\pi K\frac{x_j}{c}\right]\sin(\phi_i)$$

Similarly to the direct frequency mixing approach, in this case one can generate the four multiplicative terms above and combine them to leave only the DC component, or alternatively one can filter out the higher frequency component of each of the multiplicative terms using a second set of low-pass filters (23) and keep only the DC components which contain the depth and doppler information in its amplitude.

In order to separate the doppler and depth information, one can change K in the FMCW frequency sweep over time, e.g., alternating its sign, and to compare the resulting DC components shifts between both modulation slopes.

A drawback of direct FM demodulation is the fact that the reflectivity of the object ($\rho_j$) and the frequency shift get mixed in this DC value. According to some embodiments, this can be addressed by demodulating the amplitude separately:

$$I_{1Q}(t)I_{1Q}(t)+I_{1I}(t)I_{1I}(t)=\rho_j^2 A(x_j)_i^2$$

Alternatively, in cases where the imaging and reference oscillators are the same, the object reflectivity can be obtained also from the multiplicative terms between the signal components and the reference components before the time-derivative (e.g. as provided by the first mixer (121) and second mixer (122) from FIG. 2).

For use of the direct FM demodulation approach, FIG. 2 illustrates a time derivation module (15) and the one or more mixers (121)-(124) that include a third mixer (123), designed to mix the first in-phase component (7) and the time-derived reference quadrature component (91), and a fourth mixer (124), designed to mix the first quadrature component (8) and the time-derived reference quadrature component (91). Therefore, the embodiment in FIG. 2 provides a demodulation scheme that includes both frequency and amplitude demodulation simultaneously.

Figure 3:
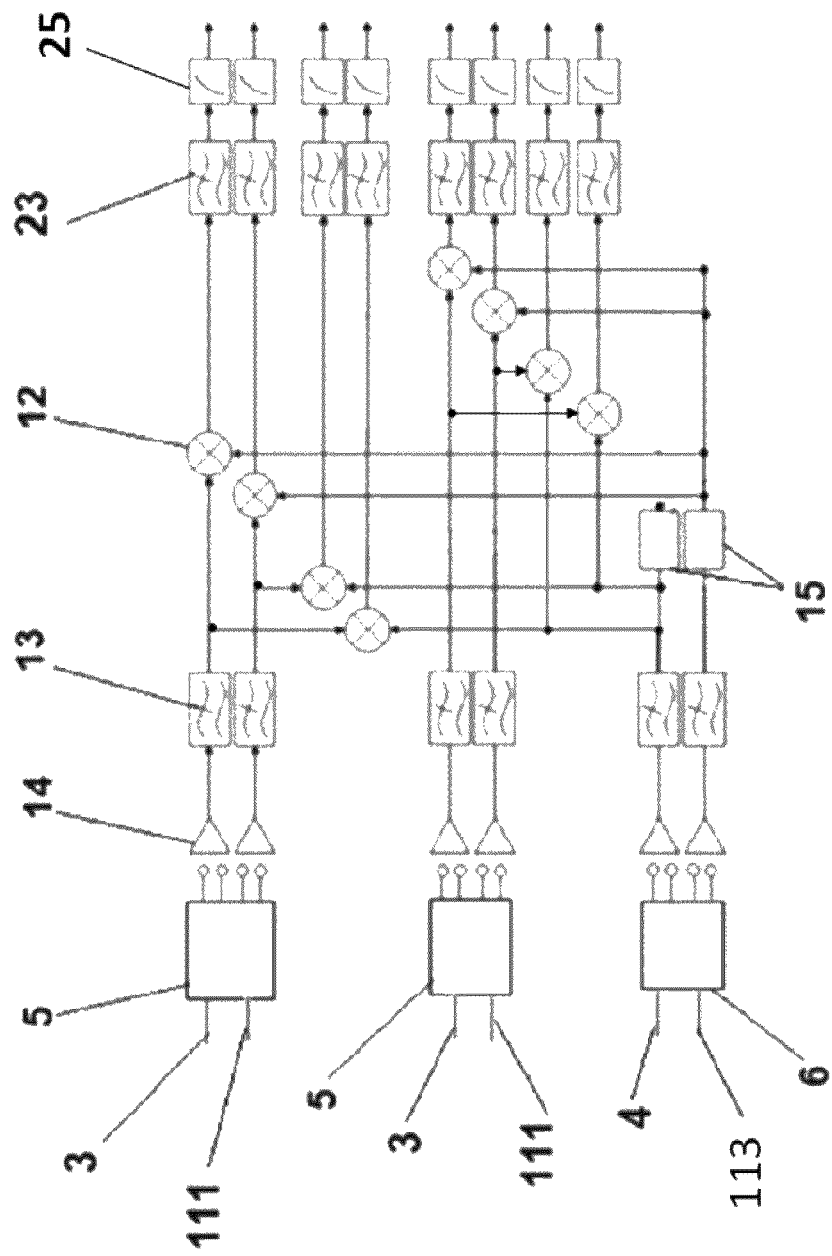
FIG. 3 shows a scheme of the LIDAR system in an embodiment of the invention with a reference channel and an array of imaging channels with direction information encoded in the relative phase between them.

FIG. 3 shows an implementation where multiple imaging channels (3) are combined with a common reference channel (4) obtained from reflected light (112) coming from the same scene but mixed with a separate optical source (one of a different wavelength but which is coherent with at least a fraction of the power collected from the scene).

The advantage of the scheme shown in FIG. 3 is that the different imaging channels (3) preserve the relative phase difference (contained in the IQ data) in the electrical domain after demodulation. This allows for the coherent combination of the demodulated signals coming from said imaging channels (3) in order to recover the different directions.

Figure 5:
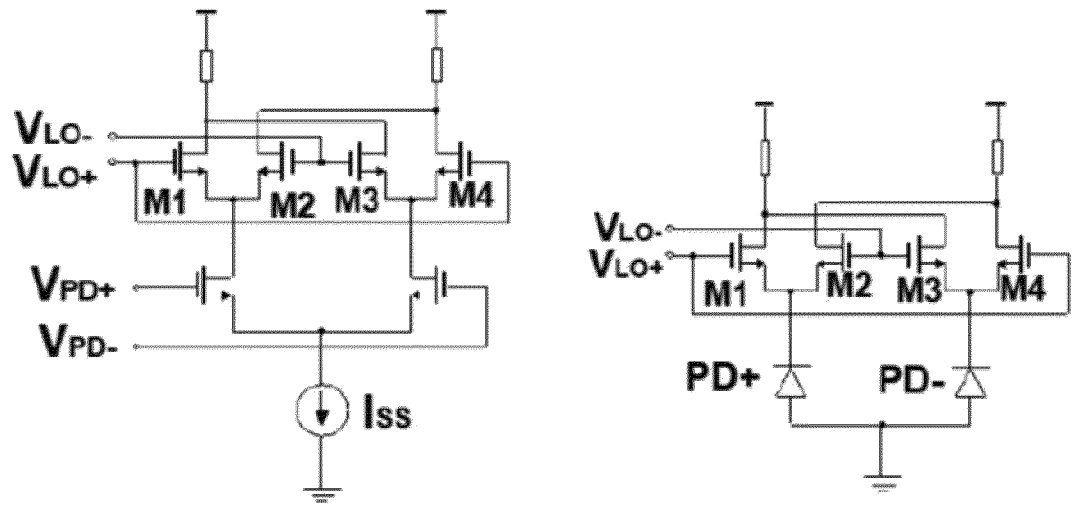
FIG. 5 shows two schemes of a Gilbert cell, one including the photodetectors to enable direct multiplication of the differential photocurrent.

For the various mixers (represented collectively as 12 in FIG. 3), it is possible to use different construction schemes. For example, the mixers may be implemented in the analog domain on the basis of circuits that rely on a translinear scheme. One of these circuits may be a Gilbert cell, an example of which is depicted in FIG. 5. This circuit has the advantage of working in all four quadrants of the interference signals. Given that the inputs to the cell are differential and voltage-based, the photocurrents coming from the optical IQ receivers (5, 6) above may be amplified by a transimpedance amplifier (14) to a voltage and, if appropriate, derived in the analog domain, according to some embodiments.

In order to simplify the Gilbert cell, it may be possible to use the photocurrents of a balanced differential pair as the source of both input signals and current bias. This will reduce the need for intermediate transimpedance amplifiers and make the cell more amenable to replication to achieve large scale integration. According to some embodiments, the imaging oscillator (111) to be mixed with the different imaging channels (3) can be generated and distributed as a voltage signal over the detection array (e.g., the imaging channels) from a single imaging input aperture (101) without major scalability issues.

Figure 6:
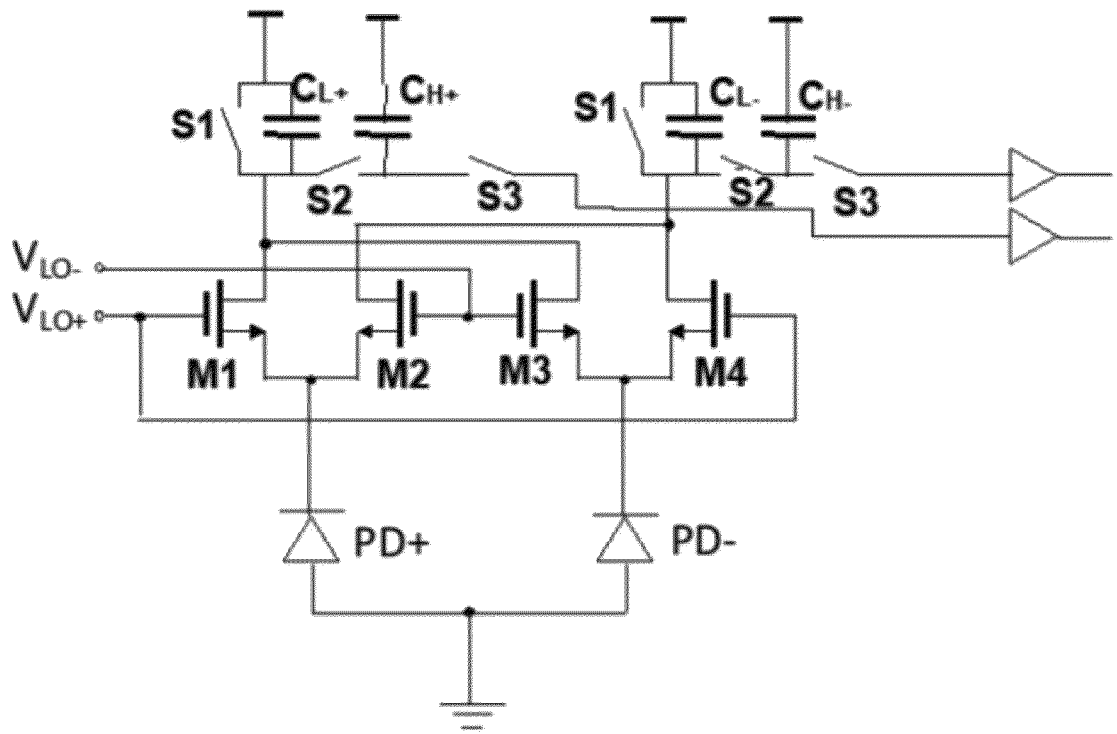
FIG. 6 shows an integration scheme of a Gilbert cell, using switched capacitors.

In order to simplify the readout of the cell, integration schemes with switched capacitors and multiplexed video outputs can be applied as shown, for example, in FIG. 6. Readout of such switched capacitors can be structured in the same way as normal imaging sensors. For example, the switched capacitors can be organized by column and multiplexing schemes can be used to route the analog values to appropriate ADC circuitry.

Figure 4:
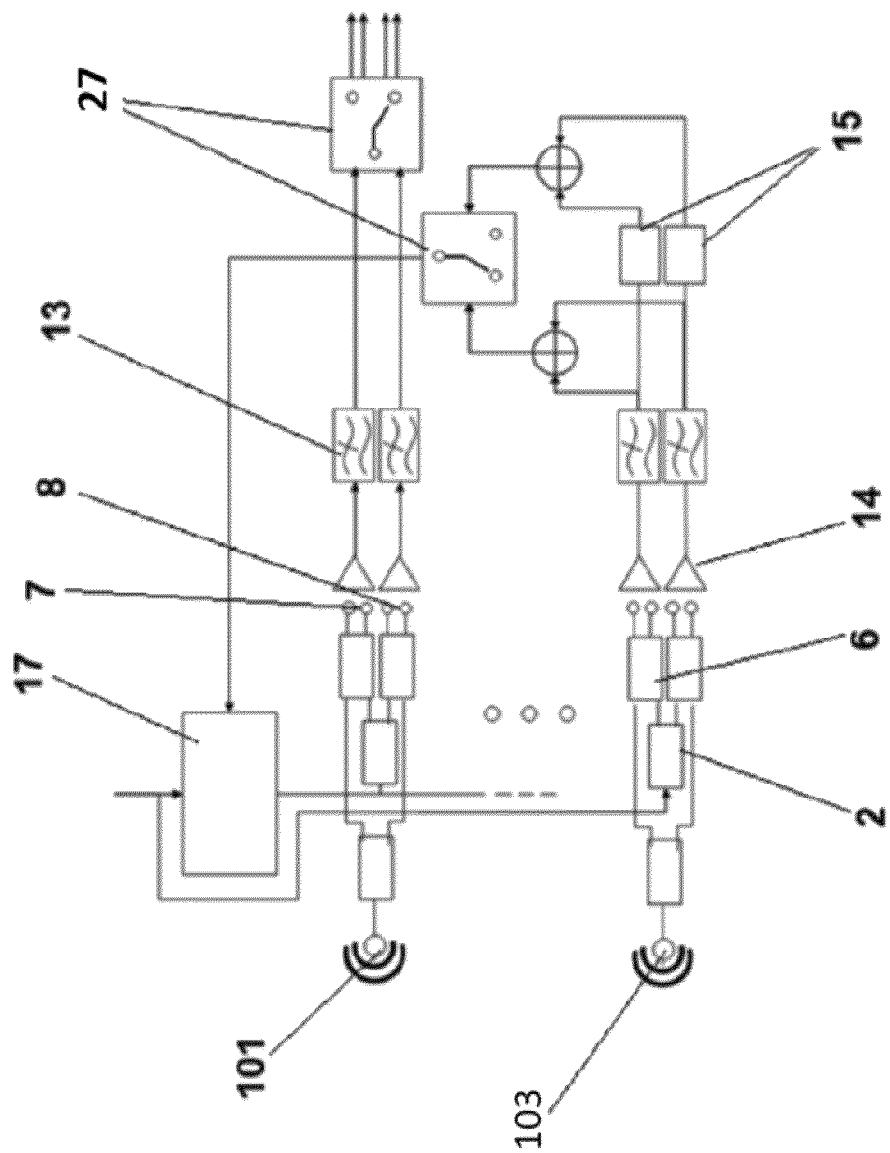
FIG. 4 shows a scheme of the LIDAR system in an embodiment of the invention with a plurality of input apertures and an amplitude modulator for direct mixing of the reference signal on the photodetectors.

Lastly, in order to provide the desired mixing function, it is also possible to modulate the amplitude of the optical local oscillator that goes to each of the imaging channels. If this is done, no electronic mixing is needed after photodetection, which provides advantages in terms of system complexity. According to some embodiments, an optical modulator (17) is used to modulate the amplitude of the optical local oscillator, as shown in FIG. 4. In an embodiment, the optical modulator (17) is an optical amplitude modulator, whether based on electro-optic absorption, a Mach-Zehnder interferometer or otherwise.

If the amplitude modulation leaves some level of phase modulation, a phase modulator can be added in series to ensure constant phase operation and avoid undesired frequency shifts in the reference channel. Amplitude modulation can also be obtained in different ways, such as through an optical amplifier, modulation of a laser current, etc.

In some embodiments, the first in-phase component (7), the first quadrature component (8), the reference in-phase component (9) and the reference quadrature component (10) are multiplied with different versions of the signal and shifted 90° relative to each other in order to achieve the desired mathematical result directly. To achieve this physically, distribution of separately modulated reference signals to each output mixer (12) may be used. Given the fact that the modulation to be applied to these two channels is also orthogonal in the electrical domain, it is possible, in some embodiments, to add them together in the modulation signal, as shown in FIG. 4.

According to some embodiments, the products between the first in-phase component (7) and the first quadrature component (8) or between the reference in-phase component (9) and the reference quadrature component (10) produce high-frequency intermodulation products that can be filtered out.

In order to separate the amplitude and distance information, the modulation signal applied to the optical modulator (17) can be switched between different modes (with or without time derivative) so that alternatively depth information and/or signal amplitude is recovered, according to some embodiments. This time-domain multiplexing, which may be suitable for implementation with an integrator that is synchronized with the switching of the demodulation signal, can also be replaced by other multiplexing schemes (frequency domain multiplexing, code multiplexing, etc.). Switching the demodulation signal on both the imaging channel and the reference channel can be performed using switches (27).

According to some embodiments, FIG. 4 shows the combination of the two implementation options described above—Doppler frequency demodulation by means of amplitude modulation of the optical reference signal and time multiplexing of amplitude/frequency demodulation, for the case of a single wavelength.

The invention claimed is:

1. A light detection and ranging (LIDAR) system with suppressed Doppler frequency shift, wherein the system comprises:
   at least one light source configured to emit a first light,
   at least one imaging input aperture and one imaging channel associated with the at least one imaging input aperture and configured to receive an input reflected light that is reflected by a moving object that is irradiated by the light source,
   at least one reference aperture and one reference channel associated with the at least one reference aperture and configured to receive a reference reflected light that is reflected by the moving object that is irradiated by the light source,
   at least one imaging oscillator,
   at least one imaging optical receiver associated with the imaging input aperture and the at least one imaging oscillator and configured to obtain an interference signal between the input reflected light and the at least one imaging oscillator,
   a reference oscillator, wherein the at least one imaging oscillator is separately modulated with respect to the reference oscillator, a reference optical receiver associated with the reference aperture and the reference oscillator and configured to obtain a reference interference signal between the reference reflected light and the reference oscillator, and at least one mixer, connected to the at least one imaging optical receiver and to the reference optical receiver and configured to produce an intermodulation product between the interference signal and the reference interference signal, such that the Doppler frequency shift caused by the moving object is cancelled or decreased.

2. The LIDAR system of claim 1, wherein the at least one imaging optical receiver is an optical IQ receiver configured to obtain an interference signal between the input reflected light and the at least one imaging oscillator comprising a first in phase component and a first quadrature component, and the reference optical receiver is an optical IQ receiver configured to obtain a reference interference signal comprising a reference in-phase component and a reference quadrature component.

3. The LIDAR system of claim 2, further comprising a time derivation module, associated with the reference optical receiver and intended to time derivate the reference in-phase component and the reference quadrature component.

4. The LIDAR system of claim 2, wherein the at least one mixer comprises:
 a first mixer, configured to mix the first quadrature component and the reference in-phase component,
 a second mixer, configured to mix the first in-phase component and the reference in-phase component.

5. The LIDAR system of claim 2, wherein the at least one mixer comprises:
 a first mixer, configured to mix the first quadrature component and the reference quadrature component,
 a second mixer, configured to mix the first in-phase component and the reference quadrature component.

6. The LIDAR system of claim 3, wherein the at least one mixer comprises:
 a first mixer, configured to mix the first in-phase component and the time-derived reference quadrature component, and
 a second mixer, configured to mix the first quadrature component and the time-derived reference quadrature component.

7. The LIDAR system of claim 3, wherein the at least one mixer comprises:
 a first mixer, intended to mix the first in-phase component and the time-derived reference in-phase component, and
 a second mixer, intended to mix the first quadrature component and the time-derived reference in-phase component.

8. The LIDAR system of claim 4, further comprising a low-pass filter associated with each mixer.

9. The LIDAR system of claim 1, wherein the reference oscillator and the at least one imaging oscillator share a common origin.

10. The LIDAR system of claim 1, wherein the reference aperture is the same as the input aperture and the reference channel and the imaging channel are derived from it by means of a splitter.

11. The LIDAR system of claim 1, wherein the reference oscillator's wavelength stays static and the at least one imaging oscillator's wavelength is swept following a standard FMCW (Frequency Modulated Continuous Wave) scheme.

12. The LIDAR system of claim 1, further comprising one or more low-pass filters, associated with the optical receivers and configured to filter the interference signal and the reference interference signal.

13. The LIDAR system of claim 2, further comprising transimpedance amplifiers positioned following the reference optical receiver and the at least one imaging optical receiver, and configured to amplify the reference in-phase component, the reference quadrature component, the first in-phase component and the first quadrature component.

14. The LIDAR system of claim 1, wherein the at least one mixer is a Gilbert cell.

15. A LIDAR system that comprises:
 at least one light source configured to emit a first light,
 at least one imaging input aperture and one imaging channel associated with the at least one imaging input aperture and configured to receive an input reflected light that is reflected by a moving object that is irradiated by the light source,
 at least one reference aperture and one reference channel associated with the at least one reference aperture and configured to receive a reference reflected light that is reflected by the moving object that is irradiated by the light source,
 at least one imaging oscillator,
 at least one imaging optical receiver associated with the imaging input aperture and the at least one imaging oscillator and configured to obtain an interference signal between the input reflected light and the at least one imaging oscillator,
 a reference oscillator,
 a reference optical receiver associated with the reference aperture and the reference oscillator and configured to obtain a reference interference signal between the reference reflected light and the reference oscillator, and
 an optical modulator connected to the at least one imaging oscillator, and configured to apply an amplitude or phase modulation to the at least one imaging oscillator with a signal derived from the reference channel, such that an intermodulation product between the interference signal and the reference interference signal appears at the output of the at least one imaging optical receiver, such that the Doppler frequency shift caused by the moving object is cancelled or decreased.

16. The LIDAR system of claim 15, wherein the at least one imaging optical receiver is an optical IQ receiver configured to obtain an interference signal between the input reflected light and the at least one imaging oscillator comprising a first in phase component and a first quadrature component, and the reference optical receiver is an optical IQ receiver configured to obtain a reference interference signal comprising a reference in-phase component and a reference quadrature component.

17. The LIDAR system of claim 15, wherein the reference oscillator and the at least one imaging share a common origin.

18. The LIDAR system of claim 15, wherein the reference aperture is the same as the input aperture and the reference channel and the imaging channel are derived from it by means of a splitter.

19. The LIDAR system of claim 15, wherein the reference oscillator's wavelength stays static and the at least one imaging oscillator's wavelength is swept following a standard FMCW (Frequency Modulated Continuous Wave) scheme.

20. The LIDAR system of claim 15, further comprising one or more low-pass filters, associated to the optical receivers and configured to filter the interference signal and the reference interference signal.

21. The LIDAR system of claim 16, further comprising transimpedance amplifiers positioned following the reference optical receiver and the at least one imaging optical receiver, intended to amplify the reference in-phase component, the reference quadrature component, the first in-phase component and the first quadrature component.

22. A method for suppressing Doppler frequency shift in the LIDAR system of claim 1, and comprising the steps of:
  emitting a first light, aimed at a moving object,
  receiving a reflected light coming from the moving object,
  obtaining a first interference signal between the reflected light and an imaging oscillator,
  obtaining a reference interference signal between the reflected light and a reference oscillator, and
  obtaining an intermodulation product between the interference signal and the reference interference signal, such that the Doppler frequency shift caused by the moving object is cancelled or decreased.

* * * * *